No. 610,121. Patented Aug. 30, 1898.
J. H. CHENOWETH.
GATE.
(Application filed July 15, 1897.)
(No Model.) 2 Sheets—Sheet 2.
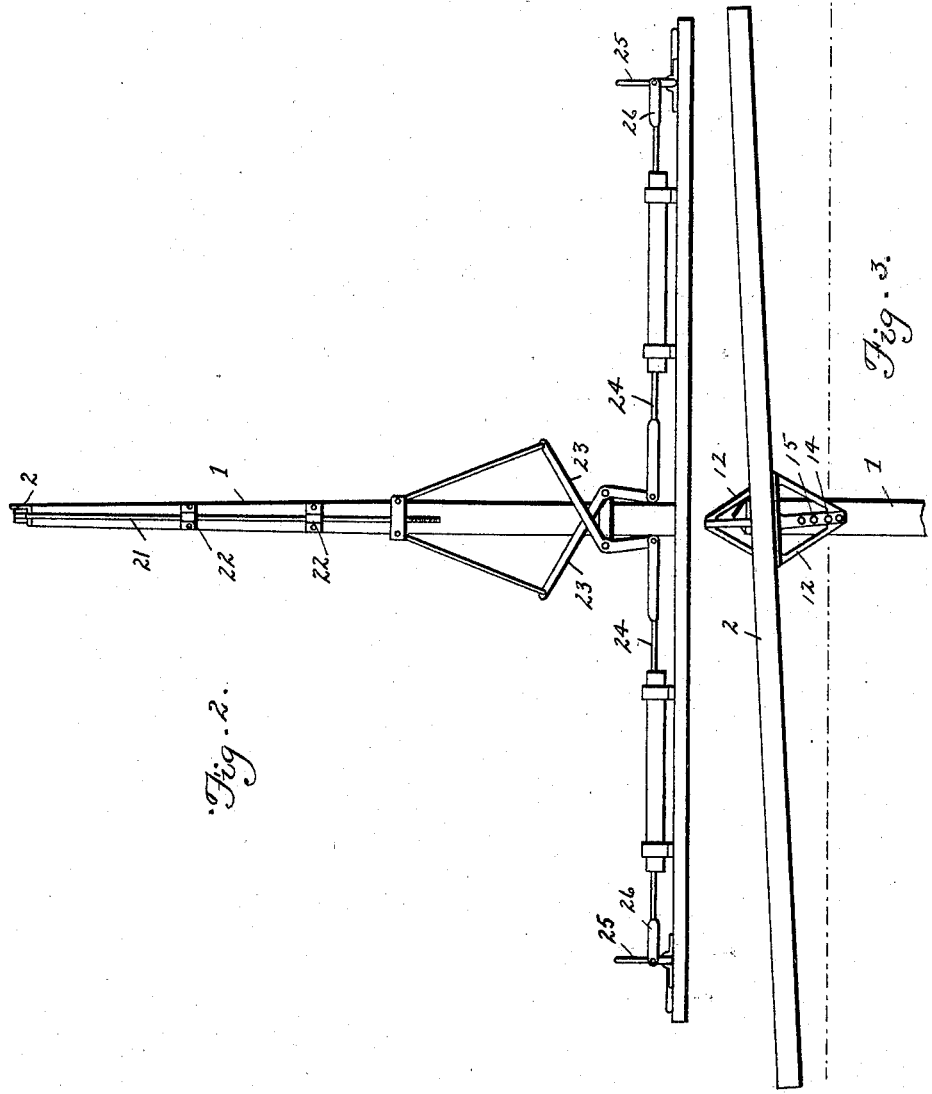
Witnesses
Lee J. Van Horn
Victor J. Evans
Inventor
John H. Chenoweth
by John Wedderburn
Attorney

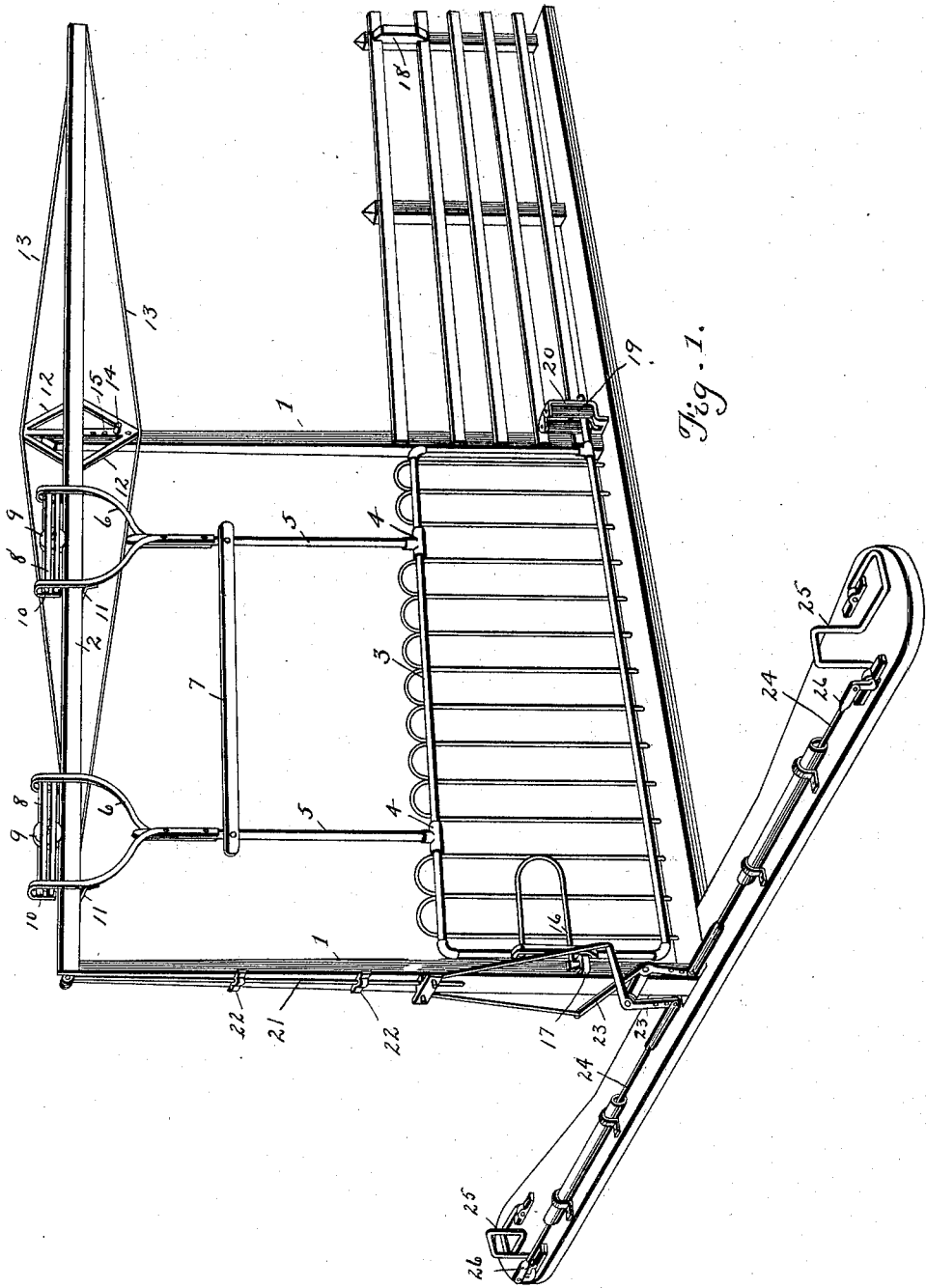

UNITED STATES PATENT OFFICE.

JOHN H. CHENOWETH, OF PARIS, ILLINOIS.

GATE.

SPECIFICATION forming part of Letters Patent No. 610,121, dated August 30, 1898.

Application filed July 15, 1897. Serial No. 644,682. (No model.)

*To all whom it may concern:*

Be it known that I, JOHN H. CHENOWETH, of Paris, in the county of Edgar and State of Illinois, have invented certain new and useful Improvements in Gates; and I do hereby declare the following to be a full, clear, and exact description of the invention, such as will enable others skilled in the art to which it appertains to make and use the same.
This invention is an improvement in sliding gates and mechanism for automatically opening and closing the same; and the same consists in the particular construction and combination of the parts, as hereinafter fully described, and particularly set forth in the claim.

In the drawings forming part of this specification, Figure 1 is a perspective view of a sliding gate and operating mechanism constructed in accordance with my invention.
Fig. 2 is an end view of the gate. Fig. 3 is a detail view illustrating the adjustment of the tilting rail or overhead support for the gate.

In carrying out my invention posts or uprights 1 1 are planted upon opposite sides of the roadway, and pivoted at or near the upper end of one of these posts is a rail or beam 2, forming a track and support for the gate.

The gate proper (designated by the numeral
3) is made up in any suitable manner, preferably of metal presenting a rectangular frame having vertical wires forming panels. To the upper bar of the frame of the gate are connected T-couplings 4 4, to which are connected upright bars 5, carrying roller-frames 6 at their upper ends, the said rods being strengthened by a brace-bar 7. Each roller-frame presents a yoke, the ends of which are bent and have attached thereto parallel strips 8 8, forming one of the bearings for a roller 9, having stub-axles, the other bearing for the roller being between similar strips 10, attached to the yoke on a line with the aforesaid strips. This manner of journaling the rollers within the frame reduces the friction, as said rollers not only have a revolving movement, but in addition travel within the frame. To each roller-frame is secured an angle-plate 11, providing a stop or guide to prevent the roller-frame jumping the track-rail.

The track-rail or pivoted supporting-beam for the gate preferably consists of an angle-bar provided centrally with oppositely-projecting braces 12, over which pass truss-rods 13, extending to the ends of the track-rail and serving to brace the same, the said truss-rods being disposed so as not to interfere with the movement of the roller-frames which carry the gate. The track-rail is pivoted to its supporting-post by means of a bearing-pin 14, carried by a base-plate, the said bearing-pin passing through one of a vertical series of openings 15 in the lower brace 12.

The gate is provided with a latch 16, consisting of a looped bar of spring metal rigidly attached to the gate at one end, while its free end is passed through a slot and terminates in a head adapted to engage a catch-plate 17, rigidly secured to the gate-post. The rearward movement of the gate is limited by means of a stop-block 18, secured to the upper part of one of the fence-posts, while the said gate is guided by vertically-disposed rollers 19 19, bearing against the lower horizontal bar of said gate. These rollers are journaled within a bracket 20, having vertical standards forming the upper bearings.

The tilting rail which supports the gate projects beyond the gate-post 1, and to the same is connected an operating-rod 21, having a vertical movement in guide-loops 22, secured to said post, the lower end of the rod being connected by rods or wires 22 to a pair of bell-crank levers 23 23, pivoted to a cross-bar supported by the gate-post, said bell-crank levers being oppositely disposed, as shown. To the lower ends of the bell-crank levers are connected horizontal rods 24 24, extending in opposite directions from the gate and connected at their outer ends to double-crank shafts 25, said shafts bearing in suitable boxes secured to base-boards located at one side of the roadway. The connecting-rods are preferably run through piping or underground conduits to protect them, and where they are connected to the double-crank shafts a threaded coupling 26 is employed to adjust the tension of said rods. Adjustment is made between the operating-rod and bell-crank levers by providing the ends of the bell-crank levers with a series of holes with which the wires engage and connecting said wires to a threaded sleeve.

From the foregoing description, in connection with the accompanying drawings, the operation of my improved sliding gate will be readily understood, for the inclination of the track upon which the gate is mounted can be quickly changed, allowing the gate to open and close by gravity. In the accomplishment of this a wagon or other vehicle passing upon the road is driven over the double-crank shaft and through its connections with the said pivoted rail will change the inclination. When the gate closes, the latch thereof automatically engages the catch-plate, and the opposite throw of the track-rail or supporting-beam will lift the latch out of such engagement, freeing the gate, so that it will slide open.

A gate constructed in accordance with my invention provides one that is entirely automatic in its operation, the double-crank shafts being arranged to provide for opening the gate by a vehicle approaching the same in either direction, and also provides for closing the gate.

Having thus described my invention, what I claim as new, and desire to secure by Letters Patent, is—

In a sliding gate, the combination of a track-rail having central oppositely-projecting braces, truss-rods extending over the braces to the ends of the rail, the lower brace being provided with a vertical series of holes, a bearing-pin carried by a post or upright at one side of the roadway upon which the track-rail is pivoted by said pin engaging one of the holes in the lower brace, an operating-rod connected to one end of the track-rail bell-crank levers connected to the operating-rod double-crank shafts connected by rods to the bell-crank levers; together with a gate having uprights, rollers carried in the upper ends of the uprights and traveling upon the track-rail, and a spring-latch secured to the forward end of the gate, said latch engaging a catch-plate carried by the gate-post substantially as shown and for the purpose set forth.

In testimony whereof I have signed this specification in the presence of two subscribing witnesses.

JOHN H. CHENOWETH.

Witnesses:
F. M. RUDE,
GEO. W. BAHER.